(12) United States Patent
Eichenlaub

(10) Patent No.: US 8,947,605 B2
(45) Date of Patent: Feb. 3, 2015

(54) IMAGE DATA PLACEMENT METHOD FOR A TIME MULTIPLEXED AUTOSTEREOSCOPIC DISPLAY

(75) Inventor: Jesse B. Eichenlaub, Penfield, NY (US)

(73) Assignee: Dimension Technologies, Inc., Rochester, NY (US)

( * ) Notice: Subject to any disclaimer, the term of this patent is extended or adjusted under 35 U.S.C. 154(b) by 433 days.

(21) Appl. No.: 13/481,004

(22) Filed: May 25, 2012

(65) Prior Publication Data

US 2012/0229462 A1 Sep. 13, 2012

Related U.S. Application Data

(63) Continuation-in-part of application No. 12/613,946, filed on Nov. 6, 2009, now Pat. No. 8,189,129.

(60) Provisional application No. 61/112,424, filed on Nov. 7, 2008.

(51) Int. Cl.
*G02F 1/1335* (2006.01)
*G02B 27/22* (2006.01)
*G09G 3/00* (2006.01)
*G09G 3/34* (2006.01)
*H04N 13/00* (2006.01)
*H04N 13/04* (2006.01)
*G09G 3/36* (2006.01)

(52) U.S. Cl.
CPC ............ *G02B 27/2214* (2013.01); *G09G 3/003* (2013.01); *G09G 3/3426* (2013.01); *H04N 13/0029* (2013.01); *H04N 13/0411* (2013.01); *H04N 13/0413* (2013.01); *H04N 13/0415* (2013.01); *H04N 13/0418* (2013.01); *H04N 13/0422* (2013.01); *G09G 3/3611* (2013.01); *G09G 2300/023* (2013.01); *G09G 2310/0237* (2013.01); *G09G 2310/024* (2013.01); *G09G 2320/068* (2013.01); *G09G 2354/00* (2013.01)
USPC ................. 349/15; 349/61; 349/84; 349/139; 349/143; 349/144

(58) Field of Classification Search
CPC ............ G02B 27/2214; G02B 27/2264; G02F 1/1313; G02F 1/1335; G02F 1/1343
USPC .............. 349/1, 15, 56, 61, 84, 139, 143, 144
See application file for complete search history.

(56) References Cited

U.S. PATENT DOCUMENTS

| 4,717,949 A | 1/1988 | Eichenlaub |
| 4,829,365 A | 5/1989 | Eichenlaub |
| 5,410,345 A | 4/1995 | Eichenlaub |

(Continued)

OTHER PUBLICATIONS

Holliman, Nick. "3D Display Systems" Department of Computer Science, University of Durham, Feb. 2, 2005.

(Continued)

*Primary Examiner* — Jennifer Doan
(74) *Attorney, Agent, or Firm* — Brown & Michaels, PC (57) ABSTRACT

An autostereoscopic display in which image data, in the form of grey level information for red, green, and blue components of pixels in multiple images representing multiple perspective views of a scene, are recombined into a second set of images generally consisting of parts of all the original multiple perspective images, arranged within the second set of images in such a way that a 3D image is seen when the second set of images are displayed in sequence.

12 Claims, 5 Drawing Sheets

(56) References Cited

U.S. PATENT DOCUMENTS

| | | | |
|---|---|---|---|
| 6,064,424 A | 5/2000 | van Berkel et al. | |
| 6,157,424 A | 12/2000 | Eichenlaub | |
| 7,046,271 B2 | 5/2006 | Doerfel et al. | |
| 7,245,430 B2 * | 7/2007 | Kobayashi et al. | 359/464 |
| 7,321,343 B2 | 1/2008 | Klippstein et al. | |
| 7,760,430 B2 * | 7/2010 | Shestak et al. | 359/465 |
| 2006/0221270 A1 | 10/2006 | Ioki et al. | |
| 2007/0109811 A1 | 5/2007 | Krijn et al. | |
| 2010/0118218 A1 | 5/2010 | Eichenlaub | |

OTHER PUBLICATIONS

International Search Report and Written Opinion for International Application No. PCT/US2009/063558. Issued on Jun. 21, 2010.

* cited by examiner

IMAGE DATA PLACEMENT METHOD FOR A TIME MULTIPLEXED AUTOSTEREOSCOPIC DISPLAY

REFERENCE TO RELATED APPLICATIONS

This is a continuation-in-part patent application of co-pending application Ser. No. 12/613,946, filed Nov. 6, 2009, entitled "Backlighting System for a 2D/3D Autostereoscopic Multiview Display", which claimed benefit under 35 USC §119(e) of provisional application No. 60/112,424, filed Nov. 7, 2008, entitled "BACKLIGHTING SYSTEM FOR A 2D/3D AUTOSTEREOSCOPIC MULTIVIEW DISPLAY". The aforementioned application(s) are hereby incorporated herein by reference.

FIELD OF THE INVENTION

The invention pertains to the field of stereoscopic displays. More particularly, the invention pertains to the creation and display of high resolution 3D images that can be seen without 3D glasses.

DESCRIPTION OF RELATED ART

U.S. Pat. No. 5,410,345, assigned to Dimension Technologies, Inc. (DTI), describes a method of creating high resolution 3D images by means of multiple sets of flashing vertical light lines placed behind and parallel to the pixel columns of a rapidly scanned LCD display. The parent application to this continuation-in-part, published as U.S. 2010/0118218, describes a variation on this method whereby the flashing lines are tilted relative to the pixels of the display. The advantage of the latter configuration is that it allows more flexibility in changing the number of 3D perspective views displayed and flexibility in tradeoffs between resolution in the vertical and horizontal directions and the number of views, all by varying the number of flashing lines that are displayed.

Both methods require that data from multiple images be interleaved into multiple fields containing data from different parts of all of the images, and arranged in different patterns in each field. The specific data placement patterns will vary depending on the number of perspective views that are being displayed, the resolution of the 3D images compared to the LCD that is used to make them, and the manner in which any loss of resolution is distributed between the horizontal and vertical directions on the image.

Figure 3:
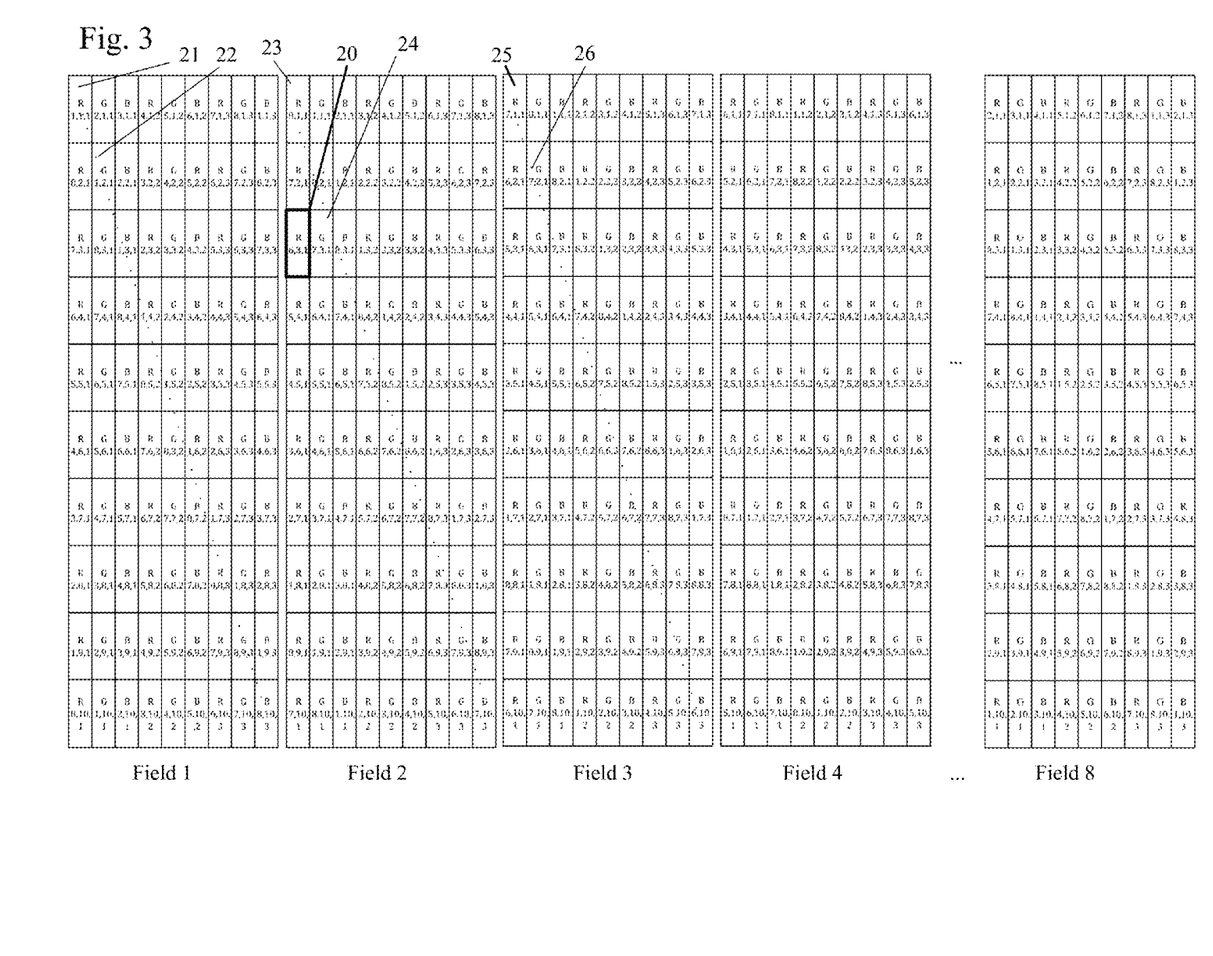
FIG. 3 illustrates the manner in which interleaved data from the eight perspective images of FIG. 2 are placed in each of the eight fields.

The most commonly used prior art autostereoscopic 3D displays use lenticular lenses or parallax barriers placed in front of a flat panel display, usually an LCD. LCDs generally possess pixels in straight rows and columns. Each pixel is usually made up of three sub elements, one colored red, another colored green, and another colored blue. The sub elements are usually arranged in a horizontal row in the order red, green, blue (R, G, B) within each pixel. Pixel coordinates of a display with resolution X, Y are usually represented with the pixel at the upper leftmost corner being designated pixel 1,1; and the pixel located at the lower right hand corner being designated pixel X, Y, with the first coordinate being the column and the second coordinate being the row. Thus the red elements, the green elements, and the blue elements all form columns of elements of the same color. Such pixel element arrangements are illustrated in FIG. 3.

The lenses or barriers are typically slanted in such a way that they are parallel to diagonals of (RGB) pixel elements on the display. Since the pixel elements typically have a width to height ratio of 1:3, the lenses or barrier stripes are usually tilted at an angle of approximately 18.435 degrees from vertical, though other angles are sometimes used, depending on the vertical and horizontal dimensions of the pixel elements. Lenticular lens display of this type are well known to the art and are sold commercially by several sources.

Images are typically displayed on such devices by generating a number of perspective views, typically between five and twelve, each view having considerably lower resolution than the LCD itself. Diagonals of these views are displayed on the LCD in reverse order across the screen, with the first diagonal of pixel elements displaying image information from perspective view N, the second diagonal of pixel elements displaying information from perspective view N-1, and so forth, with the Nth diagonal of pixel elements displaying information from perspective view 1. The N+1 diagonal then displays another diagonal of image information from perspective view N, and so forth across the screen.

Displays of the kind discussed in the preceding paragraphs are described in U.S. Pat. No. 6,064,424 (Phillips) and U.S. Pat. Nos. 7,046,271, and 7,321,343 (X3D).

Each series of red, green, and blue pixel elements along each diagonal is typically used to display the red, green, and blue image information from a single pixel of the original perspective view image. Thus the resolution of the image in the vertical direction will wind up being ⅓ the resolution of the LCD itself. There is also resolution loss in the horizontal direction, since a person's eye sees only 1/N pixel element diagonals. Since there are three elements per pixel, the overall resolution in the horizontal direction is 3/N times the horizontal resolution of the LCD itself. The overall resolution of each perspective view, in terms of the total number of pixels, will always be 1/N times the resolution of the LCD, since the available pixels are being divided between N different perspective views.

SUMMARY OF THE INVENTION

An autostereoscopic display in which image data, in the form of grey level information for red, green, and blue components of pixels in multiple images representing multiple perspective views of a scene, are recombined into a second set of images generally consisting of parts of all the original multiple perspective images, arranged within the second set of images in such a way that a 3D image is seen when the second set of images are displayed in sequence. The display uses the type of illumination system described in U.S. Pat. No. 5,410,345 and US published application 2010/0118218.

The use of time multiplexing provides flexibility in the way in which data can be placed on the LCD in order to control how resolution of the image is distributed between the horizontal and vertical directions. Such control is beneficial since resolution loss is usually less noticeable in the vertical direction, but loss in the horizontal direction may be preferable in some images. Such control also allows tradeoffs between the number of perspective views being displayed and the resolution of the individual views.

DEFINITIONS

The following terms are used in this application and should be interpreted to mean the following:

Pixel: Abbreviation of "picture element"—the smallest image-forming unit of a video display.

Element: A component of a pixel on an electronic display which displays or represents a particular color. Pixels usually consist of one each of a red element, green element, and blue element that together make up a single pixel. "Element" is synonymous with "pixel element" and "color element."

View: An image taken from a real or virtual camera, and in particular one of a group of images that are all perspective views of some scene that are taken in such a manner that they can be combined to produce 3D images when displayed on an autostereoscopic display. "View" is synonymous with "perspective view" in this application.

Field: A partial image that is displayed in sequence with one or more other partial images to form a complete image. Examples include the two fields used to display a standard interlaced television image, or the multiple interlaced images used to create a single 3D image using the type of autostereoscopic display referenced in this application.

Frame: A single still image that is part of a collection of images that make up a video or movie. Each frame can be a collection of fields that together make up the complete single still image.

DETAILED DESCRIPTION OF THE INVENTION

The co-pending parent application to this continuation-in-part, published as U.S. 2010/0118218, describes an autostereoscopic display whereby slanted lines of light are flashed in rapid succession behind a transmissive display, which is generally a liquid crystal display panel (LCD), while the LCD displays a series of images in succession, with one image being displayed during each flash. Typically the light sources used to create each set of lines have several independently controlled sections, which are used to cause different sections of each line to turn on and off in succession, in order to follow the scan of the LCD from top to bottom, as is explained in U.S. Pat. No. 5,410,345 and the aforementioned parent application 2010.0118218.

The LCD has a resolution of M by N pixels. Each pixel on an LCD display is typically made up of three parts, called elements—a red element, a green element, and a blue element—arranged in a horizontal row within each pixel. This is illustrated in FIG. 1, in which the color pixel elements are labeled R, G and B.

Figure 1:
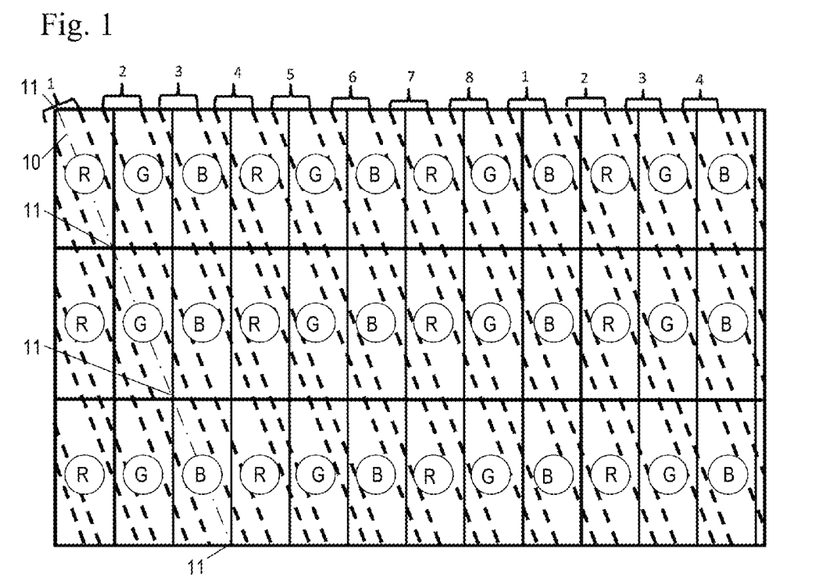
FIG. 1 is a magnified front view of a liquid crystal display showing diagonal flashing light lines situated behind the display.

The light lines 1-8, located behind the LCD, are slanted at such an angle that when viewed from certain positions in front of the display, the center line 10 of each line 1-8 seems to pass behind the corner 11 of each element R-G-B, as described in the co-pending parent application 2010/0118218 to this application and illustrated in FIG. 1. Cases in which vertical lines of light are used is illustrated in FIGS. 2 and 3 of U.S. Pat. No. 5,036,385 and FIGS. 2 and 5 of U.S. Pat. No. 5,410,345, which are incorporated herein by reference. The light lines are shown in diagonals that are slanted from left (top) to right (bottom). It is perfectly acceptable to have the lines and diagonals slanted in the opposite direction; as will be described later, the interleaving patterns will be similar, except that the interleaved image diagonals will be slanted in the opposite direction also.

The images displayed on the LCD are created by starting with a selected number (P) original images of a scene, each of which is the image of the scene as seen from a real camera (in the case of real world scenes) or a virtual (i.e. imaginary) camera (in the case of computer generated scenes). These cameras are spaced along a line at some distance from the objects being photographed, as is well known to the art of creating multi perspective view autostereoscopic images. In the case of video cameras, each camera creates a video stream consisting of a large number of still images, called frames, taken in rapid succession.

The images displayed on the LCD are formed by disassembling the P images of the scene into diagonal columns of pixel elements, then rearranging them to form M new images, where M is generally less than or equal to P, with each of the M new images composed of diagonals selected from all of the original perspective view images.

The simplest case is that in which there are P original perspective view images being rearranged into P new images, in such a way that 3D images with the full resolution of the LCD are seen while the images are being displayed and the light lines are flashing in rapid succession. The manner in which the images are disassembled, rearranged, and reassembled are analogous to the way in which images are split up and arranged along diagonals for use with autostereoscopic displays employing static lenses or barriers. The key difference is that, in the case of static barrier or lens displays, the resolution of the original perspective view images is first reduced so that the total resolution of each image is equal to R/P, where R is the total resolution of the LCD (or other type of flat panel display) it is imaged on, and P is the number of perspective views. Then the pixel element diagonals are disassembled and reassembled into a single new image, consisting of all of the diagonals from all the (reduced resolution) perspective views. This new image has the same total resolution of the LCD itself and is displayed on the screen, but the 3D image seen by the user only has 1/P times the LCD's resolution.

In contrast, the original P perspective views used with the type of display device described in patent application 2010/0118218 are first changed to (or originally created at) the same X and Y resolution as the LCD. The images are then disassembled into diagonals and the diagonals are reassembled into P new images. Those images are then displayed in rapid succession in synchronization with the flashing light lines.

In the specific case illustrated in the figures, eight images, for example of the size 1920 pixels by 1080 pixels commonly used in LCD-type televisions, are to be disassembled and then reassembled into eight 1920×1080 interleaved images for display on a 1920×1080 LCD at a rate of 240 frames per second (fps). The resulting 3D images seen by the observer will have a resolution of 1920×1080. However, in theory any number of perspective views can be displayed on an LCD of any given resolution.

This example also assumes that the 3D effect is being created by the use of light lines situated behind the LCD. As will be described later, the interleaving patterns will be similar if the 3D effect is provided by multiple sets of blinking slits in front of the LCD, except that the order in which different diagonals from different perspective views will be displayed is reversed.

Figure 2:
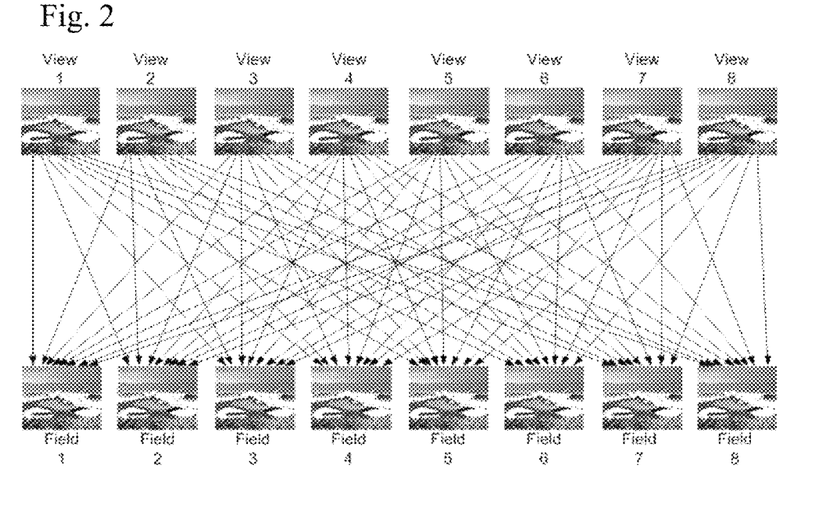
FIG. 2 illustrates eight perspective view images of a scene.

The pattern which is used in the disassembly and reassembly process is illustrated in FIGS. 2 and 3, which, with the related description, illustrate a specific example involving the creation of a 3D image made from eight 2D perspective images.

FIG. 2 shows eight 2D perspective images of a scene called "views" and labeled View 1-View 8 on the figure, the diagonals of which are interleaved into eight new images, called "field 1" through "field 8" on the figure.

FIG. 3 illustrates the interleaving pattern that is used to create the eight interleaved images from diagonals of the eight perspective view images.

The original 1920×1080 3D perspective views—view 1, view 2, view 3 . . . view 8—are numbered starting from the view rendered with the leftmost real or virtual camera to the one rendered with the rightmost real or virtual camera. These views will be interleaved to form eight images—field 1 through field 8 on FIG. 2—for display at 240 fps. The eight images can be eight stand-alone still images, or each can be a single frame from one of eight videos.

The pixels of all of the views will be mapped onto the LCD in the patterns shown in FIG. 3. Within each field, certain elements from all eight images are mapped onto different sets of diagonal lines. The parts of the figure labeled field 1, field 2; field 3, field 4 and field 8 represent the interleaved patterns used in each of the first three fields plus the eighth. Field 5 to field 7 are not shown, since the changes to the pattern from one field to the next is always the same—the interleaving pattern is very simple.

The numbering scheme within each pixel element indicates which pixel of which of the original eight images the information in that element came from. The first number represents the number of the original image (1-8). The second number represents the pixel row number within the original image. The third number represents the pixel column number within the original image. The color code (R, G, B) represents the color of the elements in both the original and final images. For example, the first red pixel element 20 in the third row of field 2 displays the red color information that was in the third pixel row and first pixel column of the sixth image (represented as 6, 3, 1). The pixel in the upper left hand corner of an image is pixel (0, 0) in all cases.

In all cases, image information from pixel element X, Y of image N is always mapped onto pixel element X, Y of one of the image fields.

As shown in FIG. 3, in field 1 the diagonal column of elements (denoted by dotted line 22) starting in the upper left-hand corner 21 displays information from the corresponding diagonal column of image 1, and the next diagonal column of elements to the right display information from the corresponding next diagonal column to the right from image 2, and so on through image 8, then back to another diagonal taken from image 1 and so forth.

In field 2 the diagonal column of elements (denoted by dotted line 24) starting in the upper left-hand corner 23 displays the information from the corresponding diagonal column from image 8, and the next diagonal column over displays information from the next diagonal column over in image 1, and so forth.

In field 3, the pattern starts with the diagonal column of elements (denoted by dotted line 26) starting in the upper left hand corner 25 displaying the information from the corresponding diagonal column from image 7, and the next diagonal column over displays information from the next diagonal column over in image 8, and so forth.

The eight interleaved fields can be combined into a continuous stream running at 240 fields per second to form a 3D video or the 3D moving images of an interactive computer program. Since eight fields together, displayed in rapid succession, form a 3D image, the eight fields taken together are called a "frame" of the 3D video. Frame 1, consisting of fields 1-8 is followed by frame 2 consisting of fields 1-8 and so forth.

The fields of the LCD and the line sets of light lines of the backlight are synchronized so that, in general, line set 1 will flash when field 1 is displayed, line set 2 will flash when field 2 is displayed, and so forth to line set 8.

In the case of still images, the fields in successive frames will be identical, created from eight still images from eight real or virtual still cameras. In the case of video images, the fields in successive frames would be created from the successive frames of eight original videos taken from eight real or virtual video cameras.

GENERAL DESCRIPTION

In the general case where an X pixel by Y pixel resolution LCD is used to display P perspective views with X pixel resolution in the horizontal direction and Y pixel resolution in the vertical direction, the pixel element diagonals of the P images will be interleaved into P fields. The image placement pattern will be identical to the eight view case described above in the sense that each red, green, and blue element of pixel S, T of the original image will be displayed on red, green, and blue elements of pixel S, T on the LCD, but the different elements will be displayed at different times.

To describe the placement of the data, it is convenient to first identify the specific location of each element of each pixel by counting individual elements from left to right, instead of whole pixels. The total number of elements situated in the horizontal direction will therefore be 3*X, and the location of individual elements can be identified as a,b where a is between 1 and 3*X and b is between 1 and Y, The original images will first be expanded, shrunk, cropped or otherwise modified to fit the LCD X and Y resolution, as is usually the case when displaying images on a monitor or television, For purposes of illustration the P perspective images to be displayed are first mapped into images composed of red, green, and blue elements arranged within each pixel in the same order as those of the pixels on the LCD, with the red brightness information being mapped into the red elements, the green brightness information being mapped into the green elements, and so on.

The brightness information for an arbitrary element located at a,b from an image representing perspective view Q (out of P) is ideally displayed on the LCD at the element located at a,b within field $\{(a-b+1)-(Q-1)\}(\mod P)$. It is understood that the (mod P) function returns a value between 1 and P, not 0 and P−1. Note that within any given field Q, image data from any element at a,b of perspective view 1 will be followed to the right by data from element (a+1) of perspective view 2, followed by element (a+2) of perspective view 3 and so forth to element (a+P−1) of perspective view P, then repeating, starting with element (a+P) of perspective view 1 and so forth across the screen.

It is possible to displace the data by full pixel rows or columns and still achieve the same effect. For example one can place the red, green, and blue elements of the first pixel of view 1 on pixel columns 3 instead of column 1 in order to displace the viewing zones 1-N to one side to match the position of users sitting to one side instead of T-on (such as the driver or passenger in a car with a centrally mounted display)—or in order to compensate for horizontal mis-positioning of the light lines.

Although this specific example assumes that the light lines and thus the interleaved element diagonals from the P images are slanted from top left to bottom right, it is also possible to use lines that are slanted from top right to bottom left. In such a case the diagonals taken from each perspective view for interleaving would be slanted from top right to bottom left. The general formula for placement of data is the same, except that the quantities (a−b+1) are replaced by the quantities (a+b−1). Within any given field, image data from any color element at a, b of perspective view 1 will still be followed to the right by data from color element (a+1) of perspective view 2, followed by color element (a+2) of perspective view 3 and so forth to color element (a+P−1) of perspective view P, then repeating, starting with color element (a+P) of perspective view 1 and so forth across the screen.

In the case where the LCD is viewed through slanted slits or stairstep slits placed in front of it, the order that the diagonals from each perspective view are placed on the screen is reversed, i.e., Within any given field, image data from any element at a, b of perspective view 1 will then be followed to the left by data from element (a−1) of perspective view 2, followed by element (a−2) of perspective view 3 and so forth to element (a−(P−1)) of perspective view P, then repeating, starting with element (a−P) of perspective view 1 and so forth across the screen. The formulas for which perspective view diagonal is placed on which LCD diagonal will be the same as above, except that the quantities (a−b+1) are replaced by (a+b−1).

Half Resolution Vertical Case

It is not always possible to recover the full resolution of the LCD when displaying 3D images. In order to display full resolution flicker free images using US television scan rate standards it is necessary to scan the LCD and refresh the images at a rate of 30*P frames per second where P is the number of perspective views.

Figure 4:
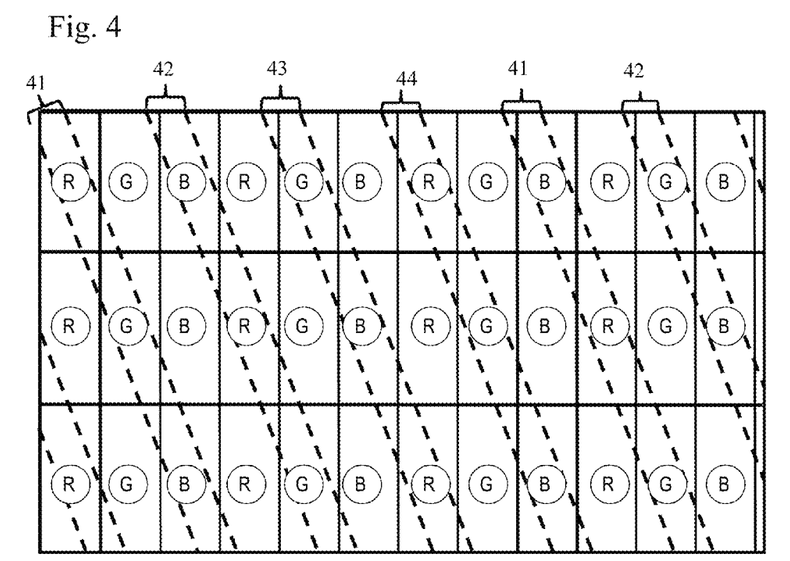
FIG. 4 is a magnified front view of a liquid crystal display showing four sets of diagonal flashing light lines situated behind the display, half the vertical resolution of the display of FIG. 1.

If the number of views is large or the LCD is slow, some tradeoff between resolution and number of views must be made. For example, in the example given above, a 240 fps LCD is used to display eight perspective views. However, if the LCD is only capable of displaying images at 120 fps, only four sets of light lines and four fields can be displayed within 1/30th second to avoid flicker. The light lines 41-44 are spaced apart by one pixel color element diagonal, as shown in FIG. 4.

The number of perspective views can remain at eight, but the eight images must be displayed at ½ the resolution of the LCD itself and be interleaved into four fields, instead of eight. Parts of all eight of these half resolution perspective views are interleaved and displayed in each of the four fields.

In this situation it is generally best if the resolution loss occurs in the vertical direction instead of the horizontal direction. Depending on the image, the eye tends to be less sensitive to resolution loss in that direction. Also, this is the direction that people who currently own 3D TV sets are used to seeing resolution loss occur—passive glasses based TVs allow each eye to see every other row of the screen, and thus each image has half the resolution of the LCD in the vertical direction.

Figure 5:
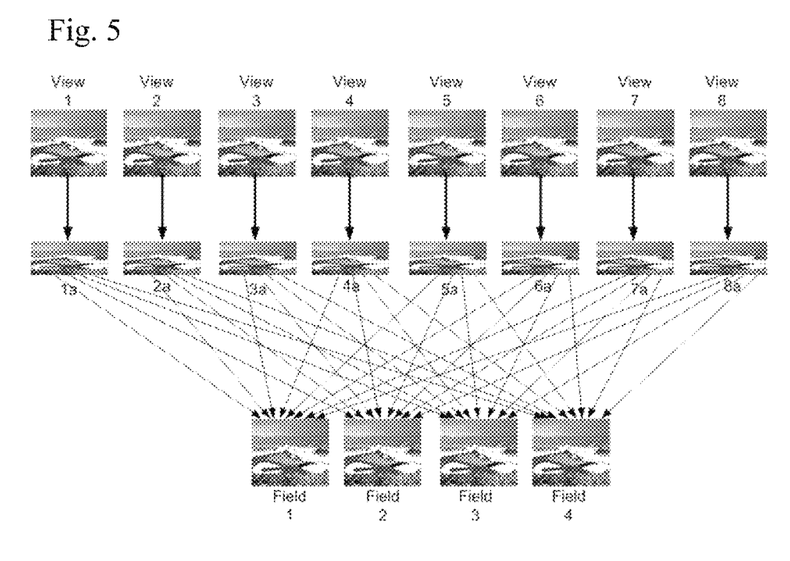
FIG. 5 illustrates eight perspective view images of a scene.
Figure 6:
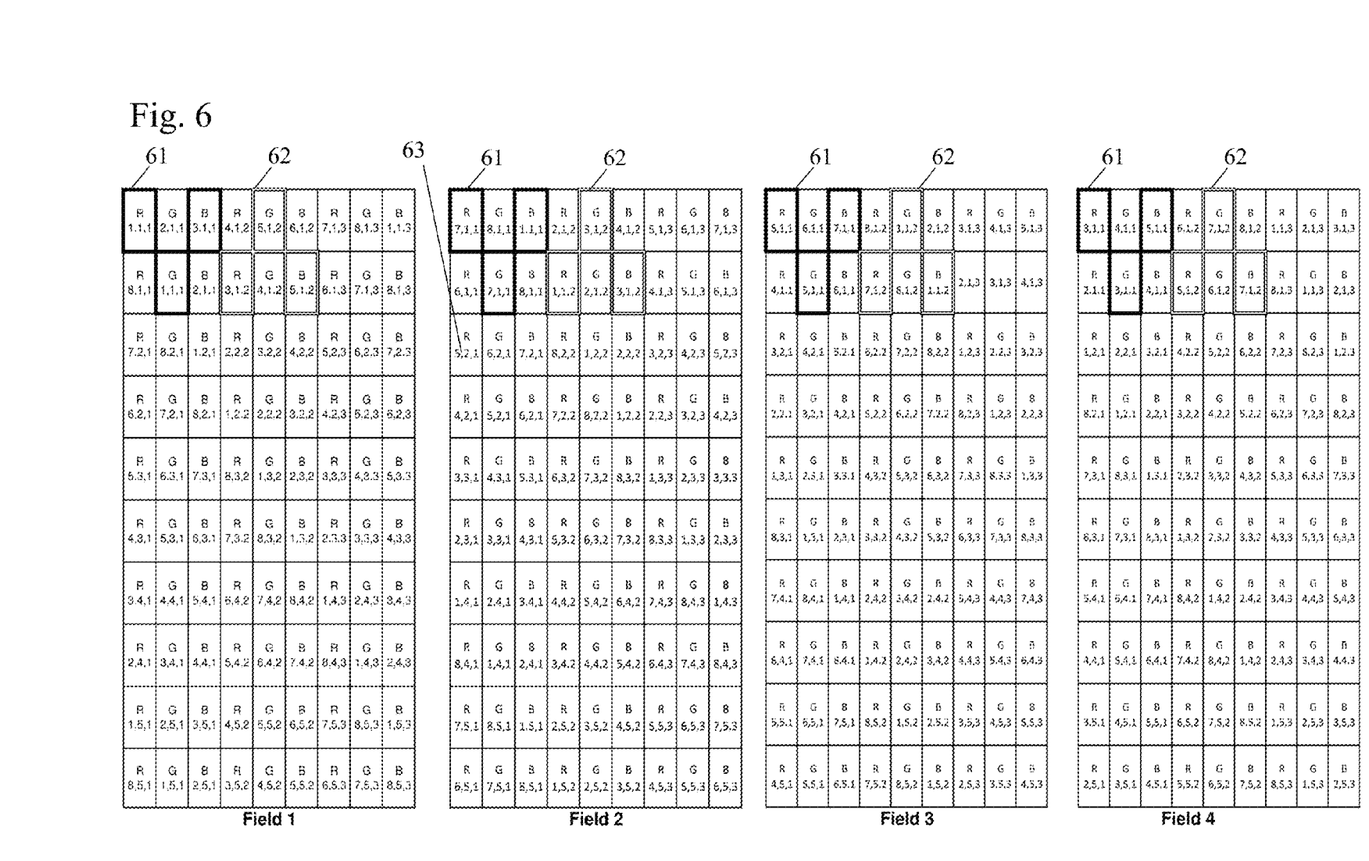
FIG. 6 illustrates the manner in which interleaved date from the eight perspective images of FIG. 5 are placed.

The type of data placement pattern required for this situation is described below, in reference to FIGS. 5 and 6. FIG. 6 shows how eight original perspectives views—view 1 through view 8—are condensed into eight new versions of these views—half-resolution views 1a through 8a—each of which has one-half the resolution in the vertical direction of the corresponding view 1-view 8. Then, the half-resolution views are interleaved into four fields—field 1 through field 4.

Figure 7:
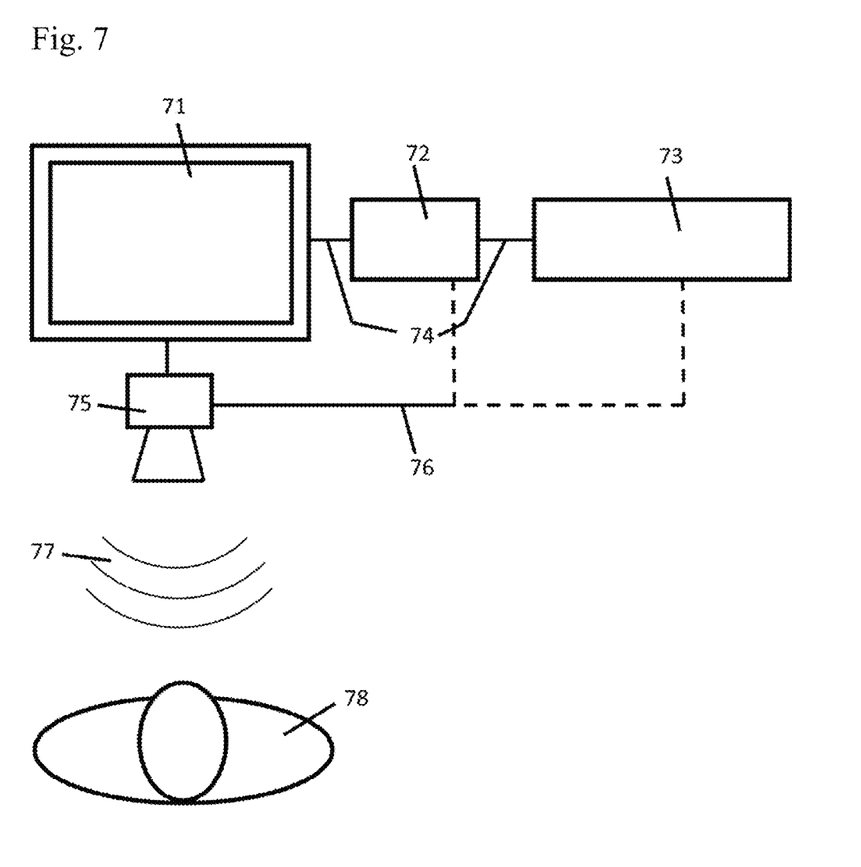
FIG. 7 illustrates a system that detects the presence of and distance to an observer and adjusts the depth of the image accordingly.

FIG. 7 shows the interleave pattern used in the ½ vertical resolution case. In this particular example, the LCD has a resolution of 1920×1080 pixels and displays images at 120 fps. The patterns described cause the resolution loss to occur in the vertical direction, with full resolution being displayed in the horizontal. In general, the resulting images will have a resolution of X by (Y/2), where X and Y are the vertical and horizontal resolutions of the LCD. So, in this example, the 3D images will therefore have a resolution of 1920×540 pixels.

The original 1920×1080 perspective views are called view 1, view 2, view 3 . . . view 8, with the numbering starting from the view rendered with the leftmost camera to the view rendered with the rightmost camera. These views are first "squeezed" into 1920×540 pixel views as illustrated in FIG. 5, forming new half-resolution views 1a, 2a, 3a . . . 8a.

Instead of being interleaved into eight fields displayed in succession at 240 fps as in the example of FIGS. 1-3, in the half-resolution views 1a-8a are interleaved into four fields—field 1 through field 4—in the manner described below. These four fields are displayed at 120 fps.

The pixels of all of the odd numbered half-resolution views 1a, 3a, 5a, 7a and even numbered half-resolution views 2a, 4a, 6a, 8a will be mapped onto the LCD in the pattern shown in FIG. 6. The group of RGB elements that form the upper leftmost (pixel 1, 1) pixel of the first row of each odd numbered half-resolution view are outlined in bold 61. The group of elements that form the second pixel (pixel 1, 2) of the first row for each even image are outlined in double lines 62.

These patterns of elements repeat across the row, and are the same for each row. Thus the pixels from the even numbered half-resolution views are mapped into the elements between the pixels from the odd numbered half-resolution views, with similar triangular groups of elements forming the pixels.

Different parts of each view will be displayed at different times, within four different fields. The mapping within each of the fields is also illustrated in FIG. 6.

The fields labeled field 1, field 2; field 3 and field 4 represent the interleaved patterns used in each of the four fields. Within each field, some of the elements of each view are mapped onto different sets of diagonal lines. Note that within each four field sequence, each element within the "odd" pixel displays appropriate parts of half-resolution views 1a, 3a, 5a, and 7a and each element within the "even" pixels displays appropriate parts of half-resolution views 2a, 4a, 6a, and 8a.

The numbering scheme within each pixel element indicates which pixel of which of the original views that the information in that element came from. The first number represents the number of the original view (1a-8a). The second number represents the pixel row number within the original view. The third number represents the pixel column number within the original view. The color codes (R, G, or B) represents the color of the elements in both the original views and the final fields.

For example, the red element 63 in the third row of field 2 displays the red color information that was in the second pixel row and first pixel column of the fifth view (represented as 5,2,1). The pixel in the upper left hand corner of a view is pixel (0, 0) in all cases.

The four interleaved fields are sent out as a continuous stream of fields running at 120 fps to form a video. Since four fields together, displayed in rapid succession, form a 3D image, the four fields taken together are called a "frame" of the 3D video. Frame 1 consists of field 1-4, and is followed by frame 2, consisting of fields 1-4, and so on.

In the case of still images, the four fields in successive frames will be identical, created from eight still views from eight real or virtual still cameras. In the case of video images, the four fields in successive frames would be created from the successive frames of eight original videos taken from eight real or virtual video cameras.

The General Case

Half-Resolution Vertical

In the general case where an X by Y resolution LCD is used to display P perspective views with X pixel resolution in the horizontal direction and Y/2 pixel resolution in the vertical direction, the number P should be even, and the element diagonals of the P images will be interleaved into P/2 fields. To describe the placement of the data, it is once again convenient to first identify the specific location of each element of each pixel by counting individual elements from left to right, instead of whole pixels. The total number of elements situated in the horizontal direction will therefore be 3*X, and the location of individual elements can be identified as a,b where a is between 1 and 3*X and b is between 1 and Y.

The original views will first be expanded, shrunk, cropped or otherwise modified to fit the LCD X and Y resolution, and then the vertical resolution will be squeezed to Y/2. For purposes of illustration the P perspective views to be displayed are first mapped into views composed of red, green, and blue elements arranged within each pixel in the same order as those of the pixels on the LCD, with the red brightness information being mapped into the red elements, the green brightness information being mapped into the green elements, and so on.

The brightness information for any element of an arbitrary location a,b from an image representing an odd numbered perspective view Q (out of P) with resolution X,Y/2, is ideally displayed on the LCD at location (a,[(b*2)-1]) if a is odd or (a,(b*2)) if a is even. The brightness information for any element of an arbitrary location a,b from an image representing an even numbered perspective view Q (out of P) with resolution X, Y/2, is ideally displayed on the LCD at location (a,(b*2)) if a is odd or (a,[(b*2)-1]) if a is even. In any of these cases the value [(B*2)-1] or (b*2) is called "c". The brightness information for any element of an arbitrary location a,b from a perspective view Q (out of P) with resolution X, Y/2, is then ideally displayed on the LCD at the element located at a,c within field {(a-c+1)-(Q-1)}(mod P). It is understood that the (mod P) function returns a value between 1 and P, not 0 and P-1.

Within any given field, image data from any element at a,b of perspective view 1 will be followed to the right by data from element (a+1) of perspective view 2, followed by element (a+2) of perspective view 3 and so forth to element (a+P-1) of perspective view P, then repeating, starting with element (a+P) of perspective view 1 and so forth across the screen.

It is possible to displace the data by rows or columns of complete pixels and still achieve the same effect. For example one can place the first pixel of view 1 on column 3 instead of column 1 in order to displace the viewing zones 1-N to one side to match the position of users sitting to one side instead of T-on (such as the driver or passenger in a car with a centrally mounted display)—or in order to compensate for horizontal mispositioning of the light lines.

Although this specific example assumes that the light lines are slanted from top left to bottom right, it is also possible to use lines that are slanted from top right to bottom left. In such a case the diagonals taken from each perspective view for interleaving would be slanted from top right to bottom left. The general formula for placement of data is the same, except that the quantity (a−c+1) is replaced the quantity (a+c−1). Within any given field, image data from any element at a,b of perspective view 1 will still be followed to the right by data from element (a+1) of perspective view 2, followed by element (a+2) of perspective view 3 and so forth to element (a+P−1) of perspective view P, then repeating, starting with element (a+P) of perspective view 1 and so forth across the screen.

In the case where the LCD is viewed through slanted slits or stairstep slits placed in front of it, order that the diagonals from each perspective view are placed on the screen is reversed, i.e., Within any given field, image data from any element at a, b of perspective view 1 will be followed to the left by data from element (a−1) of perspective view 2, followed by element (a−2) of perspective view 3 and so forth to element (a−(P−1)) of perspective view P, then repeating, starting with element (a−P) of perspective view 1 and so forth across the screen. The formulas for which perspective view diagonal is placed on which LCD diagonal will be the same as above, except that the quantities (a−b−1) are replaced by (a+b+1).

In all cases described above, the number of perspective views employed should be equal to the maximum refresh rate of the LCD divided by 30 if the 60 fps progressive (30 fps interleaved) standard is used (as it is the US and several other countries), or the maximum refresh rate of the LCD divided by 25 if the European PAL standard is used.

Order of Line Flashes

If the number of sets of flashing light lines is greater than 3, it is best not to flash them in order from left to right or vice-versa because instead of seeing light lines in certain stationary positions, the observer will perceive the illusion of a single set of lines that seems to travel across the screen in one direction or the other, an illusion similar to the moving light patterns produced on an old fashioned theater marquee by flashing light bulbs on and off rapidly in sequence. This type of effect is especially noticeable when large numbers of line sets are being displayed.

The best way to avoid the theater marquee effect is to flash the lines in some order other than sequentially from left to right or vice versa. Experiments performed with four, six, and eight sets of lines proved that not all non-sequential patterns work equally well; some produce a jitter effect, where lines seem to jump back and forth, and others produce flicker, but still others eliminate such visual artifacts and seem to produce even steady illumination at the flash rates that must be used in conjunction with typical LCDs.

To describe the preferred flashing sequences, we first assign numbers to each of the sets of lines, as illustrated in FIG. 1, with all members of one of the sets that flashes at a given time being labeled 1, and subsequent sets being numbered in order from left to right or right to left as 2, 3, 4 . . . N.

FIG. 1 shows the specific case of eight sets, 1 through 8. Thus if the line sets were flashing in order they would flash in a sequence 1, 2, 3, 4, 5, 6, 7, 8, 1, 2 etc., or 8, 7, 6, 5, 4, 3, 2, 1, 8, etc., while the LCD displays images appropriate for each line set.

As is explained in U.S. Pat. No. 5,410,345 and co-pending parent application 2010/0118218, which are incorporated herein by reference, all lines will usually consist of several independently controlled segments along their length, from top to bottom. When it is stated in this application that a line set is "flashed", it should be understood that, in most embodiments, the segments along the lines are being turned on, then off, from top to bottom in sequence to follow the scan of the LCD.

It should be further understood that, although FIG. 1 shows diagonally oriented light lines, the flashing sequences described herein apply equally well to sets of parallel lines oriented in any direction, including the vertical orientations described in U.S. Pat. No. 5,410,345.

To illustrate a specific example, if four sets of light lines are used, they can be numbered 1, 2, 3, and 4 as shown in FIG. 4. The number of possible unique flash sequences with only four sets of light lines is very limited. Tests with four sets of lines indicated that a repeating flashing pattern of 1, 4, 2, 3, (repeat starting at 1) was best for the prevention of theater marquee effects and jitter. A 1, 3, 2, 4 (repeat) pattern worked equally well—the only difference between these patterns is that one proceeds in reverse order from the other. They can both be described more generally as a repeated sequence of flash one set of lines, change position by two sets of lines in one direction to select the next line set to be flashed, flash that set, change direction and then change position by one set of lines to select the next set of lines to be flashed, flash that set, change direction and then change position by two sets of lines to select the next set of lines to be flashed, flash that set, then change direction and change position by one set of lines, which brings you back to the first set, flash that set, and so on, repeating the cycle continuously.

With six flashes, the most effective sequence was determined to be a similar pattern, namely 1, 6, 2, 5, 3, 4, (repeat starting at 1), which likewise can also proceed in reverse order.

For eight flashes, an even wider choice of unique flashing patterns is possible. The most effective at avoiding theater marquee and jitter again proved to be a similar pattern—1, 8, 2, 7, 3, 6, 4, 5, repeat. A 1, 5, 2, 6, 3, 7, 4, 8, (repeat) pattern was also effective in the eight line set case.

Given the patterns above, it appears that in general the best flashing sequence for N sets of lines, with an arbitrary first line set 1, is a strobing sequence that can be described as 1, N, 2, N−1, 3, N−2, . . . N/2, N−(N/2−1), (repeat). It does not matter whether the line sets are numbered from left to right or right to left, and thus whether the changes in position start from left to right or right to left.

In addition, in all cases, the start point of the flash sequence is irrelevant, since each line set consists of many different members spaced apart by N−1 other sets all the way across the screen. A flashing order of 2, 1, 3, 8, 4, 7, 5, 6, (repeat) will have an identical visual effect as the 1, 8, 2, 7, 3, 6, 4, 5, (repeat) sequence described above because it has the identical forward seven, back six, forward five, back four, forward three, back two, forward one, (repeat) sequence—expressed more generally for a set of N light lines, forward (N−1) back (N−2) forward (N−3) forward 3, back 2, forward 1, (repeat). The visual effect an any sequence will also be identical if any sequence is performed in reverse order, from left to right instead of right to left, as for example 8, 1, 7, 2, 6, 3, 5, 4, (repeat).

Thus an even more general description of sequences identical to 1, 8, 2, 7, 3, 6, 4, 5, (repeat) would be: select and flash a first set of lines, move in one direction by (N−1) sets of lines to select the next line set, flash that set, reverse direction and move (N−2) line sets to select the next line set, flash that set, reverse direction and move (N−3) sets of lines to select the next line set, flash that set . . . reverse direction and move three sets to select the next line set, flash that set, reverse direction and move two sets to select the next line set, flash that set, reverse direction and move one set to select the next line set, flash that set, and repeat again starting with the first set.

Even more generally, this can be viewed as: select and flash a first set of lines, move in one direction by (N−X) sets of lines to select the next line set (where X is an integer initially set to a value of 1), flash that set, increment X, reverse direction and move (N−X) line sets to select the next line set, flash that set, increment X, reverse direction and repeating, until X=N at which point one jumps back to the first set, at which X is reset to 1, and the sequence repeats.

Experiments have shown that the benefit of using the line flash sequences described above will apply equally well to vertically oriented light lines or slits, and to slanted lines or slits.

It is also theoretically possible to vary the flash sequence during subsequent sequences of flashes, for example 1, 8, 2, 7, 3, 6, 4, 5 followed by 8, 1, 7, 2, 3, 6, 5, 4.

These flash sequences will apply regardless of how the light lines are formed—for example, the lines can be formed by patterns or pixels in a second LCD panel that are turned on (transparent) in sequence, allowing light from a backlight to pass through them, thus forming light emitting lines. The light sources can also be various forms of lamps such as CCFL lamps, LED lamps or CCFLs with a separated LCD panel in front to cause light from different parts of the lamp to be emitted in sequence from top to bottom, as was described in U.S. Pat. No. 5,410,345.

The flash sequences will also apply to a situation where a barrier, such as a second LCD panel, is placed in front of the image forming LCD, with pixels on the barrier are turned on and off in sequence to form vertical or slanted slits, or stairstep slit patterns as described in parent application 2010/0118218. In such a case the slits can be turned transparent and off again in the sequence in the orders described above.

Varying the Depth With Viewing Distance

The displays of the type described in this disclosure and in its co-pending parent patent application 2010/0118218 are often used for purposes of point-of-sale or trade show advertising where people view the displays from a wide range of distances. The amount of depth that can be shown on such displays is usually limited by factors such as ghosting (image cross talk) and image "jump" or discontinuities between the different perspective views, all of which are well known to those well versed in the art of autostereoscopic display technology.

In general, when a given display is viewed from far away the amount of depth that can be displayed in an image without these undesirable effects occurring is greater than that which can be displayed to an observer who is close to the display. In addition, the farther away a person is from the display, the greater the depth that must be displayed in the image in order for the 3D nature of the scene to be obvious and attract the person's attention.

Therefore a useful feature on such a display is a sensor, such as an infrared (IR) sensor or ultraviolet (UV) emitter and sensor combination that, at minimum, can determine whether someone is standing close to the display (and presumably looking at it) or not. If no close-in person is detected, the display can be directed by software to display images with a great deal of depth, in order to attract the attention of people walking by at a distance, for example in the aisle at a tradeshow. If someone standing close to the display is detected, the depth can be reduced in order to minimize undesirable image effects for the close-in user, while still maintaining enough depth to make the 3D effect compelling.

The simplest method for detecting the presence of a close observer in many situations, for example on a trade show floor or in the aisle of a department store, is a single ultrasound emitter and detector combination built into or attached to the display. The emitter would emit pulses of ultrasound at a rate of at least once per second but ideally at several times per second. The timing between pulse emission and the reception of a return signal above a chosen strength would be used to determine the distance of the closest object.

Ideally the pulses would be emitted into a cone that only encompasses the area in front of the display where people will be able to stand and see good 3D images. This is typically on the order of +/−45 degrees. Examples of ultrasound sensor and emitter combinations that can measure the position of a person's head for a different purpose are described in U.S. Pat. No. 5,349,379, incorporated herein by reference.

If no object is detected within a certain range, images with a great deal of depth would be displayed in order to attract passers-by. As soon as the presence of an object, presumably a person walking into range, is detected, the amount of depth displayed will be decreased in such a way that the maximum distance between the front-most object in the scene and the screen, and the rearmost object in the scene and the screen, is reduced so that ghosting and/or image jump is not visible to the close in person viewing the display. The exact amount of depth that can be displayed for people at various distances without ghosting or image jump will vary depending on the exact design of the display including the width of the display's viewing zones, the distance to the ideal viewing plane, the amount of optical scattering which produces ghosting, display contrast and brightness, and the properties of the image itself.

A slightly more complex system could vary the image depth between different values or by a continuous range of values between some maximum and minimum as the detected distance to the closest object varied between some maximum value and some minimum value. For example, if a person was detected between 15 feet and 10 feet, a certain depth value could be displayed on the screen. If a person was detected between 10 feet and 6 feet a different, lesser, amount of depth could be displayed on the screen, and between 6 feet and 3 feet, a still lesser amount of depth could be displayed.

In some situations an ultrasound emitter will not work. For example, if the display is located behind the glass of a department store window, the glass itself will reflect the ultrasound pulses. Alternative detection methods include single low power laser rangefinders which measure distances by emitting pulses and detecting return pulses in a manner similar to that employed with ultrasound detectors. Alternatively, head/eye tracking software that is used in combination with video cameras to identify faces and eyes could be used to obtain a rough estimate distance to a person by the size of their head and their height. An example of such software is contained in the open source computer vision library called OpenCV, which is maintained by Willow Garage of Menlo Park, Calif.

The present invention is not intended to be constrained by the specific type of position and distance detector employed.

Information on the distance to the closest object detected would be fed into software that uses this information to determine how much depth is displayed in the scene being shown on the display.

Typically, this software could be present onboard a computer which is playing images to the display, or onboard an ASIC within some other type of device that is feeding images to the display. Examples of such other types of devices are the two (stereo) image to multiple perspective image converters made by VEFXI, 3D Impact Media, Dimenco, and others. These devices are designed to take in left and right eye views from a source such as a stereo video stored on a DVD or PC hard disk, or live input from two cameras, and extrapolate, in real time, several additional perspective views of the same scene as observed from different imaginary camera positions between and to the immediate left and right of the original cameras which recorded the scene. These multiple perspective views can be played out to the display and the individual frames used as the original perspective views that a disassembled and interleaved on an autostereoscopic display of the type described in this application. Such devices can be stand-alone units or built into the display itself. A variation made by VEFXI takes in 2D videos and calculates stereo views using various 2D depth views contained in the image frames.

The change in depth representation can be accomplished by switching between two or more pre-recorded animations stored on a computer and played directly to the display or played through a multiple view converter of the type described above, or two or more versions of the same animation with different amounts of depth displayed in the scene, or in the case of real time computer generated images, changing the spacing between the virtual cameras that are being used to render the perspective views. In the latter case the virtual model itself is unchanged; only the positions of the cameras change in response to information from the position/distance detector. The cameras will be brought closer together for close in viewing and farther apart for viewing by persons farther away. Ideally, the multiple perspective views are obtained from a set of parallel cameras space evenly along a straight horizontal line. The equal spacing between adjacent cameras can be increased or decreased to increase or decrease the amount of depth shown in the image.

FIG. 7 is a diagram of the distance detection and depth adjustment system. An autostereoscopic display 71, receives image information from a device 73, such as a personal computer, that either plays recorded images from a storage device or generates images in real time and sends out image data through data link 74. An optional 2D to multiview or 2D to 3D converter 72 can be placed between device 73 and display 71 in order to produce multiple perspective view images from a lesser number of images. Detection device 75, such as an ultrasound emitter and receiver combination, detects the distance of the nearest object 78, in front of the display 71 by means such as pulses of ultrasound which are reflected from object 78. Signals representing a time delay between the emitted and the reflected pulses travel through data link 76 to a PC 73 or optionally to a converter 72, which in turn determines the depth at which images must be displayed, by means such as a depth vs. distance lookup table and makes adjustments to the image by appropriate means, such as adjusting the separation of virtual cameras.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of displaying time multiplexed autostereoscopic images from a plurality of perspective views, each perspective view being an image of a scene from a position spaced along a line, on an autostereoscopic display of the type comprising an image-forming LCD having pixel elements in rows and columns and diagonal lines and a backlight having a plurality of sets of light lines oriented along the diagonal lines of the pixel elements of LCD, the backlight being arranged such that light from the light lines passes through diagonal lines of pixel elements of the LCD to a viewer, the method comprising the steps of:

a) disassembling each of the plurality of perspective views into diagonal columns of pixel elements, b) reassembling the pixel elements from the views into a plurality of fields, each field comprising diagonals of pixel elements selected from all of the original perspective views;

c) illuminating the sets of light lines of the backlight in a pattern; and d) displaying the plurality of fields on the LCD, such that the diagonals of pixel elements of the plurality of fields are displayed in synchronization with the pattern of illumination of the sets of lines of the backlight.

2. A method of reducing theater marquee effects on an autostereoscopic display of the type comprising an image-forming LCD having rows and columns of pixel elements, the LCD being illuminated by a backlight having a plurality of sets of light lines, each set of light lines being separately controllable, the method comprising:

a) displaying a plurality of images on the LCD;

b) illuminating the sets of light lines of the backlight in a pattern, such that the pixel elements of the plurality of images are displayed in synchronization with the pattern of illumination of the sets of lines of the backlight;

the pattern of illumination of the light lines of the backlight being chosen such that the sets of light lines are illuminated in an order other than sequentially from one side of the display to another.

3. The method of claim 2, in which there are N sets of light lines, and the pattern is established by the steps of:

i) selecting a first set of light lines, ii) flashing the first set of light lines;

iii) moving in a direction by (N−X) sets of lines to select the next set of light lines, where X is an integer initially set to a value of 1;

iv) flash the selected set of light lines, v) incrementing X by 1;

vi) reversing direction and move (N−X) line sets to select the next line set;

vii) flash the selected set of light lines, viii) incrementing X by 1;

ix) if X<N, repeating from step (iii), otherwise setting X to 1 and repeating the method from step (i).

4. The method of claim 2, in which there are eight sets of lines, and the pattern is a repeating 1, 8, 2, 7, 3, 6, 4, 5.

5. The method of claim 2, in which there are eight sets of lines, and the pattern is a repeating 1, 5, 2, 6, 3, 7, 4, 8.

6. An autostereoscopic display producing a plurality of perspective views to a viewer at a distance, comprising:

a) an autostereoscopic display;

b) a source of a plurality of recorded images, each recorded image comprising a three dimensional image having a depth;

c) a controller coupled to the source of recorded images and the autostereoscopic display, the controller being programmed to select a three dimensional image having a determined depth from the source of images and to display the three dimensional image on the autostereoscopic display;

d) a distance detection device, having a sensor for detecting the distance of a viewer in front of the display and a signal output coupled to the controller, such that the controller can determine the distance to the viewer from the signal output of the distance detection device;

e) the controller being programmed to select a three dimensional image having a depth based upon the distance to the viewer determined by the distance detection device.

7. The display of claim 6 in which the distance determining device is an ultrasonic distance sensor comprising an ultrasonic emitter and an ultrasonic receiver which determines a distance based upon a time delay between emitting pulses from the emitter and detecting reflected pulses in the receiver.

8. The display of claim 6, in which the controller is programmed to determine the depth using a depth vs. distance lookup table.

9. The display of claim 6, in which the depth of the three-dimensional image is created by adjusting the separation of virtual cameras.

10. A method of adjusting the depth of images displayed upon an autostereoscopic display producing a plurality of perspective views at a distance from a viewer, comprising:

a) a distance determining device determining the distance from the viewer to the display;

b) a controller selecting a three dimensional image having a depth from a source of a plurality of recorded images, each recorded image comprising a three dimensional image having a depth, based upon the distance to the viewer determined by the distance detection device.

11. The method of claim 10, in which the controller selects the image depth using a depth vs. distance lookup table.

12. The method of claim 10, in which the depth of the three-dimensional image is created by adjusting the separation of virtual cameras.

* * * * *